United States Patent
Jou (10) Patent No.: US 8,411,600 B2
(45) Date of Patent: *Apr. 2, 2013

(54) METHOD AND APPARATUS FOR ACKNOWLEDGING A RECEPTION OF A DATA PACKET IN A CDMA COMMUNICATION SYSTEM

(75) Inventor: Yu-Cheun Jou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/207,467

(22) Filed: Aug. 19, 2005

(65) Prior Publication Data
US 2006/0062178 A1    Mar. 23, 2006

Related U.S. Application Data

(63) Continuation of application No. 09/943,284, filed on Aug. 30, 2001, now Pat. No. 6,934,264.

(51) Int. Cl.
*H04B 7/005* (2006.01)

(52) U.S. Cl. ........ 370/278; 370/328; 370/332; 714/701; 455/69

(58) Field of Classification Search .......... 370/278, 370/328, 331, 230, 332, 334, 335–347; 714/701, 714/758, 786; 455/450, 69, 436
See application file for complete search history.

(56) References Cited

U.S. PATENT DOCUMENTS

| | | | | |
|---|---|---|---|---|
| 5,608,780 A | * | 3/1997 | Gerszberg et al. | 455/436 |
| 5,983,382 A | * | 11/1999 | Pauls | 714/744 |
| 6,009,553 A | * | 12/1999 | Martinez et al. | 714/784 |
| 6,038,458 A | * | 3/2000 | Siira | 455/560 |
| 6,064,888 A | * | 5/2000 | Lundqvist et al. | 455/456.4 |
| 6,069,886 A | * | 5/2000 | Ayerst et al. | 370/336 |
| 6,310,868 B2 | * | 10/2001 | Uebayashi et al. | 370/335 |
| 6,434,396 B1 | * | 8/2002 | Rune | 455/502 |
| 6,493,759 B1 | * | 12/2002 | Passman et al. | 709/227 |

(Continued)

FOREIGN PATENT DOCUMENTS

| | | |
|---|---|---|
| EP | 1056258 | 11/2000 |
| JP | 08172425 A * | 7/1996 |

(Continued)

OTHER PUBLICATIONS

International Search Report—PCT/US02/027720, International Searching Authority—European Patent Office, Jun. 26, 2003.

(Continued)

*Primary Examiner* — Chuong T Ho
(74) *Attorney, Agent, or Firm* — Won Tae Chris Kim; Howard H. Seo (57) ABSTRACT

In a communication system (100), a method and an accompanying apparatus provide for acknowledging reception of a packet of data. A receiver (400) at a serving base station (101) receives a message on an acknowledgement channel (340) for indicating the reception of the packet of data at a mobile station (102), and may determine an erasure of the message. A non-serving base station (160) may also receive the message on the acknowledgement channel (340) from the mobile station (102), determines a value of the message, and communicates the value of the message to the serving base station (101). The serving base station (101) changes the erasure to the value of the message, and terminates a transmission of a remainder of data units of the packet of data to the mobile station (102) when the value of the message is a positive acknowledgment from the non-serving base station (160).

22 Claims, 5 Drawing Sheets

U.S. PATENT DOCUMENTS

| | | | |
|---|---|---|---|
| 6,631,127 B1* | 10/2003 | Ahmed et al. | 370/349 |
| 6,856,805 B1* | 2/2005 | Raaf | 455/436 |
| 6,934,264 B2* | 8/2005 | Jou | 370/278 |
| 7,012,905 B2* | 3/2006 | Haumont et al. | 370/331 |
| 2001/0012279 A1* | 8/2001 | Haumont et al. | 370/331 |
| 2002/0099855 A1* | 7/2002 | Bass et al. | 709/249 |
| 2008/0212521 A1* | 9/2008 | Jou | 370/320 |

FOREIGN PATENT DOCUMENTS

| | | |
|---|---|---|
| WO | 9923844 | 5/1999 |
| WO | 02056534 | 7/2002 |

OTHER PUBLICATIONS

International Preliminary Examination Report—PCT/US02/027720—IPEA/US, Mar. 20, 2005.

TIA-856-A, "cdma2000 High Rate Packet Data Air Interface Specifications" Apr. 2004.

* cited by examiner

METHOD AND APPARATUS FOR ACKNOWLEDGING A RECEPTION OF A DATA PACKET IN A CDMA COMMUNICATION SYSTEM

CLAIM OF PRIORITY UNDER 35 U.S.C. §120

The present Application for Patent is a Continuation and claims priority to patent application Ser. No. 09/943,284 entitled "Method and Apparatus for Acknowledging a Reception of a Data Packet in a CDMA Communication System" filed Aug. 30, 2001 now U.S. Pat. No. 6,934,264, now allowed, and assigned to the assignee hereof and hereby expressly incorporated by reference herein.

BACKGROUND

1. Field

The present invention relates generally to the field of communications, and more particularly, to communications in a cellular communication system.

2. Background

In code division multiple access (CDMA) communication systems, unnecessary and excessive transmission by a user may cause interference for other users in addition to reducing the system capacity. The communication system may provide communication services that include wireless radio transmission of digitized speech, still or moving images, text messages and other types of data. An encoder in a transmitter of the communication system may receiver a packet of data for encoding. The encoding operation produces more data symbols than received. The encoded data may be divided into several data units. Each data unit may be transmitted in a time slot. Since the data packet is encoded, it is possible to decode the entire data packet from one or more data units without actually receiving all the data units. After receiving each data unit, the receiving destination may make a positive or negative acknowledgement of decoding the entire data packet. If the entire data packet is decoded successfully before actually receiving all the data units associated with the data packet, the transmitter should receive a positive acknowledgment to stop transmitting the remainder of the data units. Since the data packet is already properly decoded at the receiver, the communication resources are wasted if the remainder number of the data unites are transmitted.

To this end as well as others, there is a need for a method and apparatus for acknowledging reception of a data packet in a communication system.

SUMMARY

In a code division multiple access communication system, a method and an accompanying apparatus provide for acknowledging reception of a packet of data. A receiver at a serving base station receives a message on an acknowledgement channel for indicating the reception of the packet of data at a mobile station. The receiver at the serving base station may determine an erasure of the message. A receiver at a non-serving base station may also receive the message on the acknowledgement channel from the same mobile station. The receiver at the non-serving base station may determine a value of the message. The non-serving base station communicates the value of the message to the serving base station. The serving base station may change the erasure to the value of the message communicated from the non-serving base station. The change may take place when the non-serving base station has a better link quality with the mobile station. The link quality may be determined based on the received condition of a pilot channel transmitted from the mobile station. The non-serving base station may have a better reverse link quality with the mobile station than the serving base station. When the communicated value is a positive acknowledgment, the serving base station terminates the transmission of the remainder number of data units of the packet of data to the mobile station after receiving the positive acknowledgment from the non-serving base station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a system for wireless communications in accordance with the code division multiple access (CDMA) technique which has been disclosed and described in various standards published by the Telecommunication Industry Association (TIA), Third Generation Partnership Project (3GPP) and Third Generation Partnership Project 2 (3GPP2). Such standards include the TIA/EIA-95 standard, TIA/EIA-IS-856 standard, IMT-2000 standards (including cdma2000 standards and WCDMA standards), all incorporated by reference herein. A system for communication of data as detailed in the "TIA/EIA/IS-856 cdma2000 High Rate Packet Data Air Interface Specification," incorporated by reference herein, may be more particularly capable of incorporating various embodiments of the invention. A copy of the cdma2000 standards may be obtained by accessing the world wide web at www.3gpp2.org, or by writing to TIA, Standards and Technology Department, 2500 Wilson Boulevard, Arlington, Va. 22201, United States of America. The standard generally identified as WCDMA standard, incorporated by reference herein, may be obtained by contacting 3GPP Support Office, Route des Lucioles-Sophia Antipolis, Valbonne-France.

Generally stated, a novel and improved method and an accompanying apparatus provide for acknowledging reception of a data packet in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
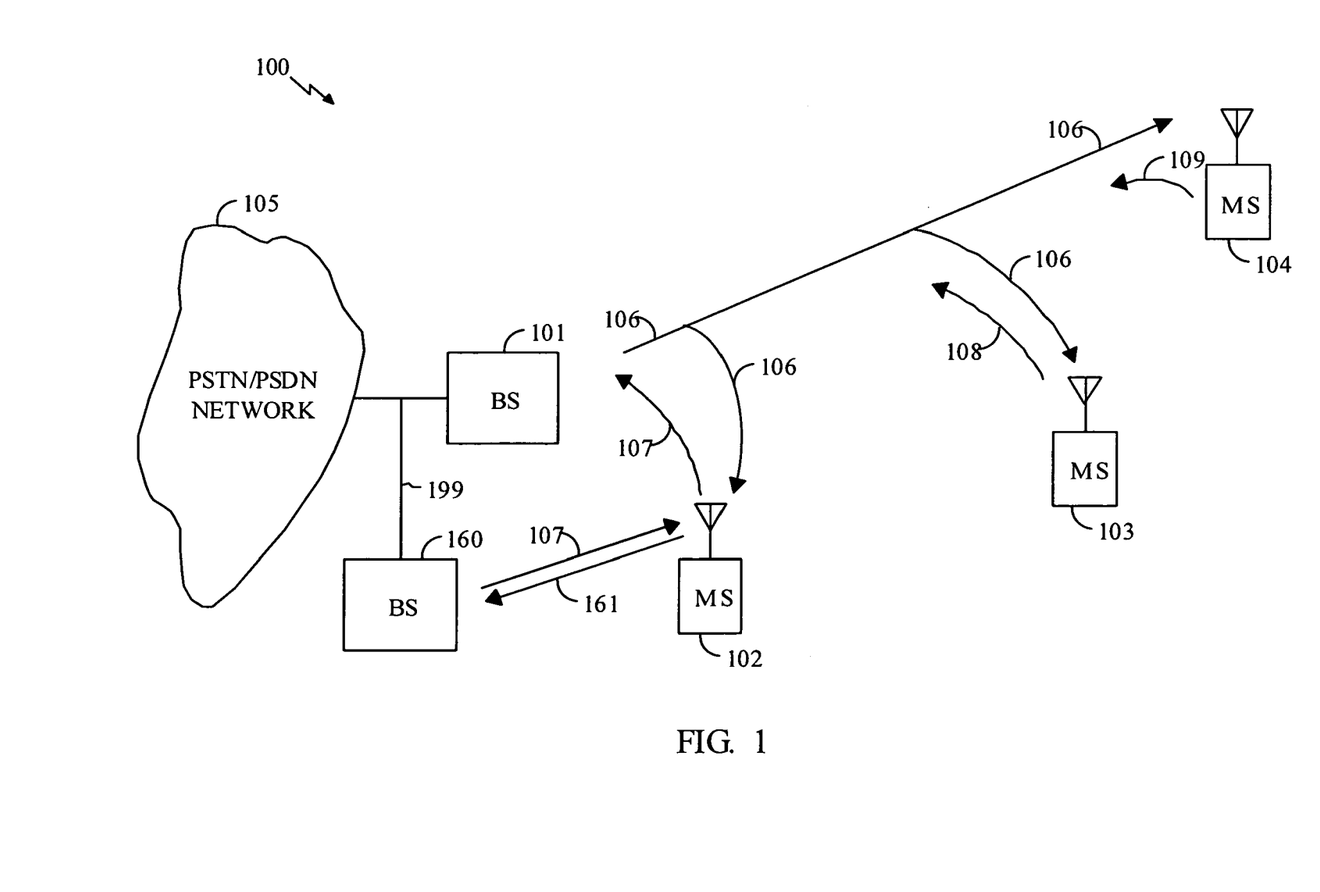
FIG. 1 illustrates a communication system 100 capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data access terminals and the base station as data access network without departing from the main scope and various advantages of the invention. Base station 101 may include a number of components, such as a base station controller and a radio frequency transceiver. For simplicity, such components are not shown. Base station 101 may also be in communication with other base stations, for example base station 160. A base station controller and a mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information that is targeted for its user. Base station 160 may also communicate with mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104.

In a soft handoff situation, base stations 101 and 160 may be communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a data packet to mobile station 102 in soft handoff, one of the base stations is selected to be a serving base station. The non-serving base station does not transmit the data packet on the forward link. On the reverse link, both base stations 101 and 160 may attempt to decode the traffic data transmission from the mobile station 102. The information on a reverse link acknowledgment channel may be decoded, in a typical implementation, only by the serving base station that is transmitting the data packet to the mobile station 102 on the forward link. The non-serving base station may ignore the acknowledgment channel.

The turnaround time for decoding the acknowledgment channel and deciding whether to continue the transmission of the remainder data units is necessary to be sufficiently short for the serving base station to terminate or continue the transmission of the remainder of data units. Therefore, in a typical implementation, only the serving base station may decode and process the acknowledgment channel. If the serving base station, however, erroneously decodes the acknowledgment channel, the communication resources may not be used very efficiently. For example, if a positive acknowledgment (ACK) is erroneously decoded as a negative acknowledgment (NAK), the transmitter continues to transmit the remaining data units. The transmission continues until the end of the data packet because the mobile station will not send an ACK message again. Continuing the transmission of the remaining data units is unnecessary and wasteful in this case. The communication resources that are used for the transmission may be used for transmitting other data packets. Moreover, the transmission may cause unnecessary interference to other users. In another example, if a negative acknowledgement (NAK) is erroneously decoded as a positive acknowledgement (ACK), the transmitter may stop transmitting remaining data units. The receiving destination therefore does not receive the data packet successfully. A retransmission of the entire data packet at a later time may be necessary. In this case, the receiver may experience a substantial delay in receiving the data packet, in addition to other problems.

Figure 2:
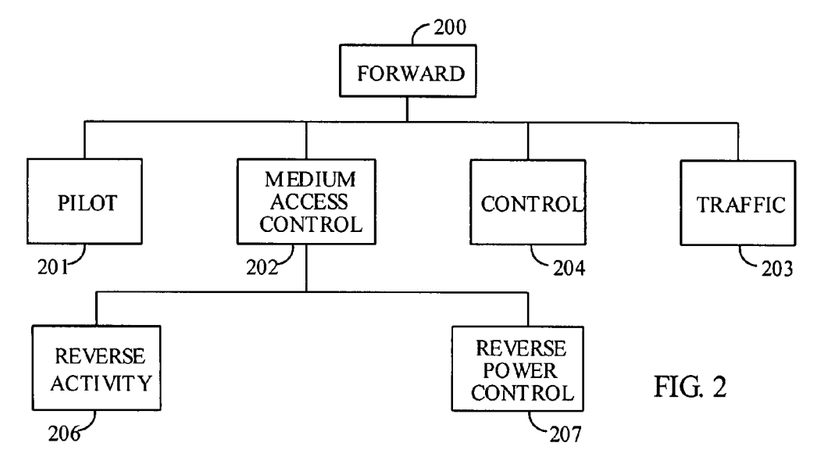
FIG. 2 illustrates an exemplary forward link channel structure.

FIG. 2 illustrates a forward channel structure 200 in accordance with an embodiment that may be used for communication on the forward link. Forward channel structure 200 may include a pilot channel 201, a medium access control (MAC) channel 202, a traffic channel 203 and a control channel 204. The MAC channel 202 may include a reverse activity channel 206 and a reverse power control channel 207. Reverse activity channel 206 is used to indicate the activity level on the reverse link. Reverse power control channel 207 is used to control the power at which a mobile station can transmit on the reverse link.

Figure 3:
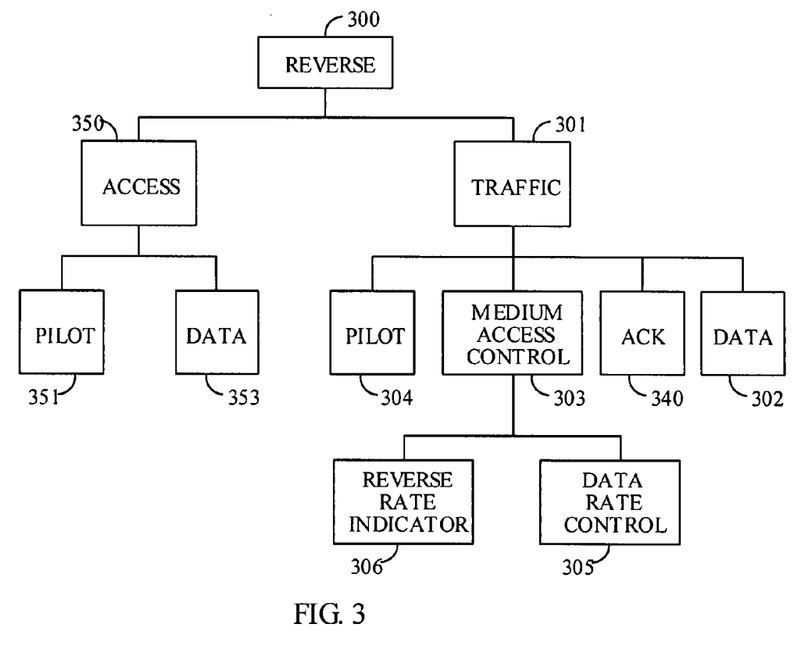
FIG. 3 illustrates an exemplary reverse link channel structure.

FIG. 3 illustrates, in accordance with an embodiment, a reverse channel structure 300 that may be used for communication on the reverse link. Reverse channel structure 300 includes an access channel 350 and a traffic channel 301. Access channel 350 includes a pilot channel 351 and a data channel 353. Traffic channel 301 includes a pilot channel 304, a MAC channel 303, an acknowledgment (ACK) channel 340 and a data channel 302. The MAC channel 303 includes a reverse link data rate indicator channel 306 and a data rate control channel (DRC) 305. Reverse rate indicator channel 306 is used for indicating the rate at which a mobile station is currently transmitting. Data rate control channel 305 indicates a data rate that a mobile station is capable of receiving on the forward link. ACK channel 340 is used for communicating whether a data packet has been decoded successfully at a mobile station.

Figure 4:
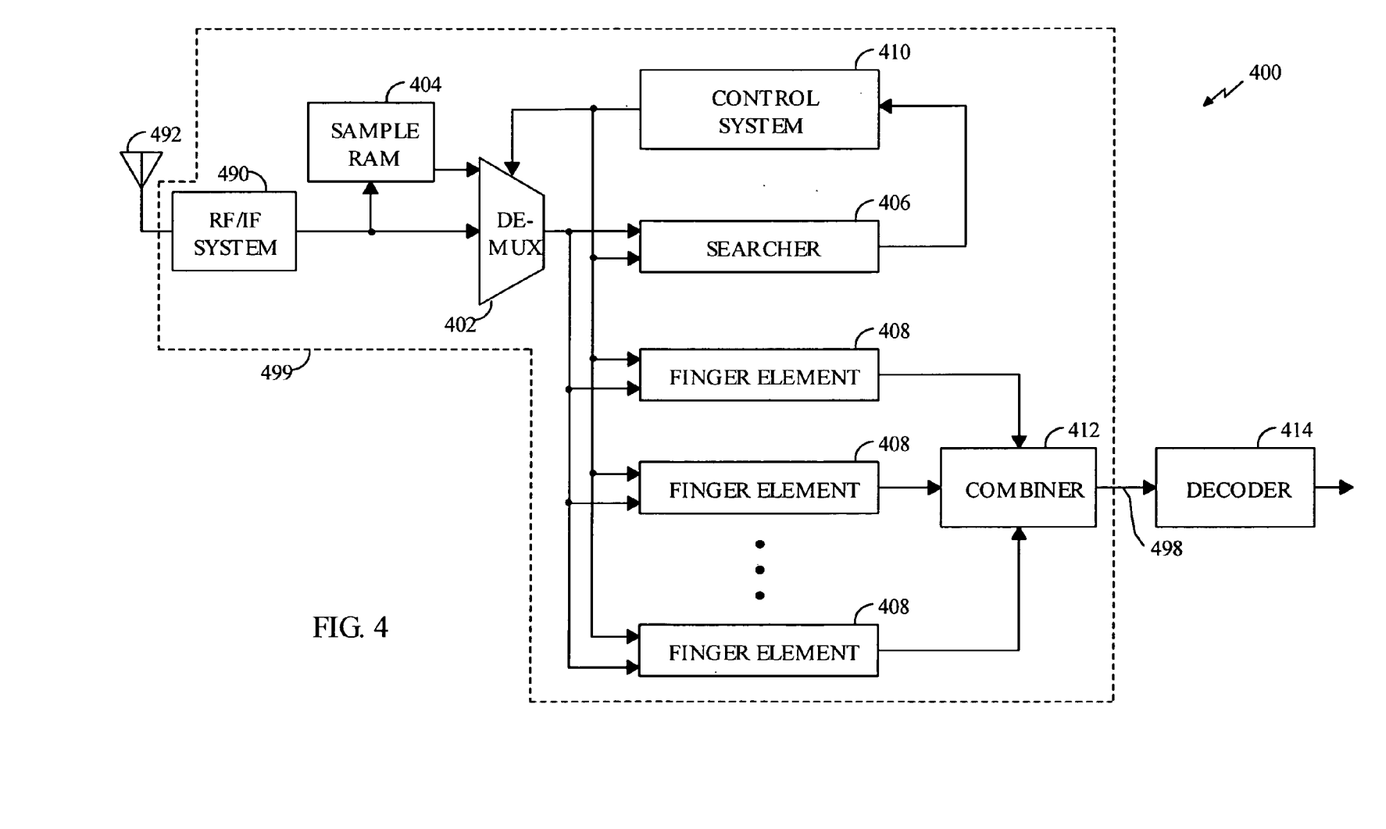
FIG. 4 illustrates a communication system receiver, for operation in a mobile station and a base station, capable of operating in accordance with various embodiments of the invention.

FIG. 4 illustrates a block diagram of a receiver 400 used for processing and demodulating the received CDMA signal. Receiver 400 may be used for decoding the information on reverse and forward links signals. Received (Rx) samples may be stored in RAM 404. Receive samples are generated by a radio frequency/intermediate frequency (RF/IF) system 490 and an antenna system 492. Antenna system 492 receives an RF signal, and passes the RF signal to RF/IF system 490. RF/IF system 490 may be any conventional RF/IF receiver. The received RF signals are filtered, down-converted and digitized to form RX samples at base band frequencies. The samples are supplied to a demultiplexer (demux) 402. The output of demux 402 is supplied to a searcher unit 406 and finger elements 408. A control unit 410 is coupled thereto. A combiner 412 couples a decoder 414 to finger elements 408.

Control unit 410 may be a microprocessor controlled by software, and may be located on the same integrated circuit or on a separate integrated circuit. The decoding function in decoder 414 may be in accordance with the Viterbi algorithm or iterative (turbo) decoding algorithm.

During operation, received samples are supplied to demux 402. Demux 402 supplies the samples to searcher unit 206 and finger elements 408. Control unit 410 configures finger elements 408 to perform demodulation of the received signal at different time offsets based on search results from searcher unit 406. The results of the demodulation are combined and passed to decoder 414. Decoder 414 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

ACK channel 340 is transmitted by a mobile station. Transmission on ACK channel 340 may be either a negative acknowledgment (NAK) or a positive acknowledgement (ACK). To limit transmission of ACK/NAK messages on the reverse link by mobile stations in connected state, each mobile station may be required to receive an assigned preamble before transmitting ACK/NAK messages. Transmission on ACK channel 340 depends on whether the mobile station has decoded a matching preamble in a received data packet in receiver 400. Control system 410 may match a decoded preamble to a preamble assigned to the mobile station. After a matching preamble is detected by control system 410, transmission on ACK channel 340 is allowed in response to each data unit of that data packet until either the packet is successfully decoded or the transmission of the data packet is completed, whichever comes earlier.

A packet of data may be divided into several data units. Each data unit is transmitted during a time slot. The first one and/or subsequent data units may contain a preamble. The mobile station should first detect and match the preamble before deciding whether to decode the data. Data units subsequent to the first data unit may or may not have the preamble. After receiving the preamble, the mobile station may transmit NAK messages in response to each data unit of that data packet until a time that the data packet targeted for its user has been decoded properly or the transmission of the data packet is completed. Therefore, the mobile station sends a NAK message to the serving base station until the data packet is decoded. The data packet may be decoded before all the data units associated with the data packet are completely received. If a received packet of data is correctly decoded, the mobile station sends an ACK message to the serving base station. The IS-856 standard describes and shows an exemplary timing relationship between the time slots used for transmission of the data units and the time slots used for transmission of ACK channel 340.

The ACK channel 340 may use a binary phase shift keying (BPSK) modulation transmitting a positive modulation symbol for a positive acknowledgment and a negative modulation symbol for a negative acknowledgment. The ACK/NAK message transmitted on the ACK channel 340 may be limited to a single data bit. In a transmitter described in IS-856 standard, the ACK/NAK message passes and repeats through a BPSK modulator. The BPSK modulator modulates ACK/NAK message, and the resulting signal is Walsh covered in accordance with an assigned Walsh code. In a base station using receiver 400, the ACK channel 340 may be demodulated. In one embodiment, the signal of the received ACK channel 340 may be compared against a positive and negative voltage threshold. If the received signal level meets the positive voltage threshold, an ACK message is considered received on the ACK channel 340. If the signal level meets the negative voltage threshold, a NAK message is considered received on the ACK channel 340.

Figure 5:
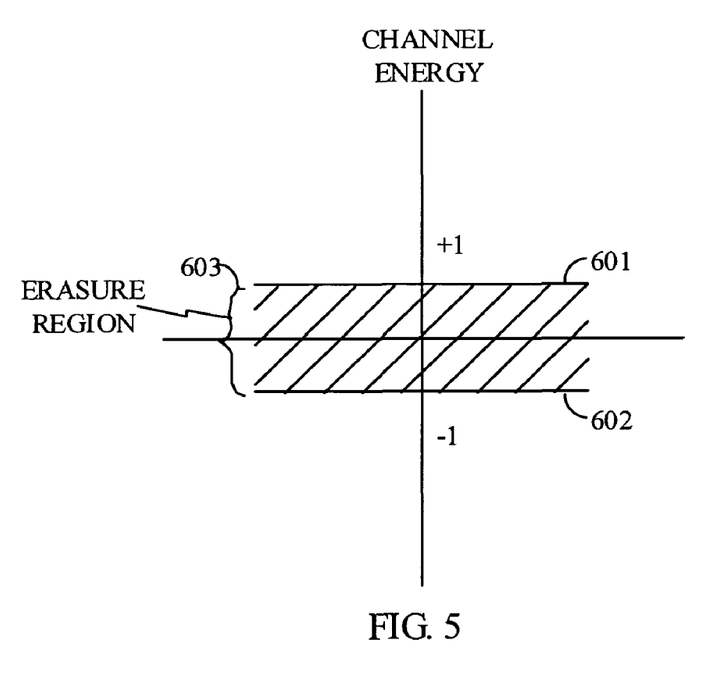
FIG. 5 illustrate comparison of modulation symbol energy to positive and negative voltage thresholds and an erasure region.

Referring to FIG. 5, demodulation of ACK channel 340 may be illustrated. The resulting signal may be compared against a positive voltage threshold 601 and a negative voltage threshold 602. If the signal is above the positive voltage threshold 601, an ACK message is considered received on the ACK channel 340. If the signal is below the negative voltage threshold 602, an NAK message is considered received on the ACK channel 340. The positive and negative voltage thresholds 601 and 602 may not be at the same level. As such, an erasure region 603 may be created between the positive and negative voltage thresholds 601 and 602. If the resulting demodulated signal falls in the erasure region 603, receiver 400 may not be able to determine whether an ACK or NAK message has been transmitted from the mobile station on ACK channel 340.

When the signal is in the erasure region, it is not clear whether an ACK or NAK has been transmitted. If the erasure is changed to an ACK and when in fact a NAK is transmitted from the mobile station, the base station stops transmitting the remainder of the data units, and the mobile station would not timely receive the packet of data. One of the measured system qualities may be the certainty associated with proper and on time delivery of a data packet to a mobile station. To avoid such a problem, in one embodiment, an erasure may be changed to a NAK. If the mobile station in fact has transmitted an ACK and receiver 400 in the serving base station detects an erasure, changing the erasure to a NAK message presents one or more problems. In such a case, the base station continues the transmission of the remainder data units when in fact the transmission of the remainder of the data units is not necessary. Unnecessary transmission causes degradation in the system capacity and interference for other users.

In accordance with various embodiments of the invention in a communication system 100, a mobile station 102 may be in a soft handoff condition with base stations 101 and 160. The base station 101 may be the serving base station on the forward link, and the base station 160 may be the non-serving base station on the forward link. In communication system 100, a method and accompanying apparatus provide for an efficient acknowledgment of decoding a data packet at serving base station 101. In accordance with an embodiment, at the serving base station 101, a message on an acknowledgement channel, such as ACK channel 340, for indicating the reception of the data packet at mobile station 102 is received. Receiver 400 at serving base station 101 may determine an erasure of the message. In accordance with an embodiment, the non-serving base station 160 may also decode the message on the acknowledgement channel, such as ACK channel 340, from mobile station 102. Receiver 400 at the non-serving base station 160 may determine a value of the message. To determine the value of the message at the serving base station 101 and non-serving base station 160, the received signal of the ACK channel 340 from mobile station 102 may be compared to a modulation voltage threshold, such as thresholds 601 and 602 as shown and described with reference to FIG. 5.

In accordance with an embodiment, the non-serving base station 160 may communicate the value of the message to the serving base station 101 via back-haul 199. The communications over back-haul 199 may be sufficiently fast for the communication from the non-serving base station 160 to the serving base station 101 to occur in a time less than or equal to a time required for the serving base station 101 to schedule a transmission of the next data unit in the data units of the data packet. The serving and non-serving base stations may also determine a reverse link quality from the mobile station. The link quality may be measured based on the quality of a pilot channel transmitted from the mobile station. Determining quality of a received pilot channel is well known. In one aspect, the amplitude and phase of the pilot channel may determine the quality. A higher received amplitude provides a better link quality. The non-serving base station may have a better link quality than the serving base station. In accordance with an embodiment, the serving base station 101 may change the erasure of the message to the value of the message as determined and communicated by the non-serving base station 160. The change may occur when the non-serving base station has a better reverse link quality with the mobile station. The determined value by the non-serving base station 160 may be a positive acknowledgment of the message. If the value is a positive acknowledgement, the serving base station 101 may terminate a transmission of the next data unit of the data packet to mobile station 102 from the serving base station 101 after receiving the positive acknowledgment from the non-serving base station 160. If the value is a negative acknowledgement, the serving base station 101 may continue transmission of the remainder data units to mobile station 102 from the serving base station 101 after receiving the negative acknowledgment from the non-serving base station 160.

The mobile station may have an active set of base stations that is capable of maintaining a communication. The base stations in the active set have at least a reverse link quality with the mobile station that is adequate for establishing a communication link. The principle of creating and maintaining an active set are well known, and described in various standards incorporated by reference herein. In one embodiment, the non-serving base station may be included in the active set of base stations of the mobile station. The base stations in the active set of base stations may demodulate the ACK channel 340 transmitted from the mobile station. Each base station in the active set may determine whether an ACK or NAK is transmitted by the mobile station. The serving base station may receive the results of demodulating the ACK channel 340 at the base stations in the active set. The serving base station may determine whether an ACK is transmitted based on the received results from the active set base stations, when the serving base station detects an erasure on the ACK channel. If no ACK is detected by any of the active set base stations, the erasure is considered to be a NAK. If at least one of the active set base stations with higher quality reverse link detects an ACK, the erasure at the serving base station may be changed to an ACK, and the transmission of the remaining data units may be terminated at the serving base station.

Figure 6:
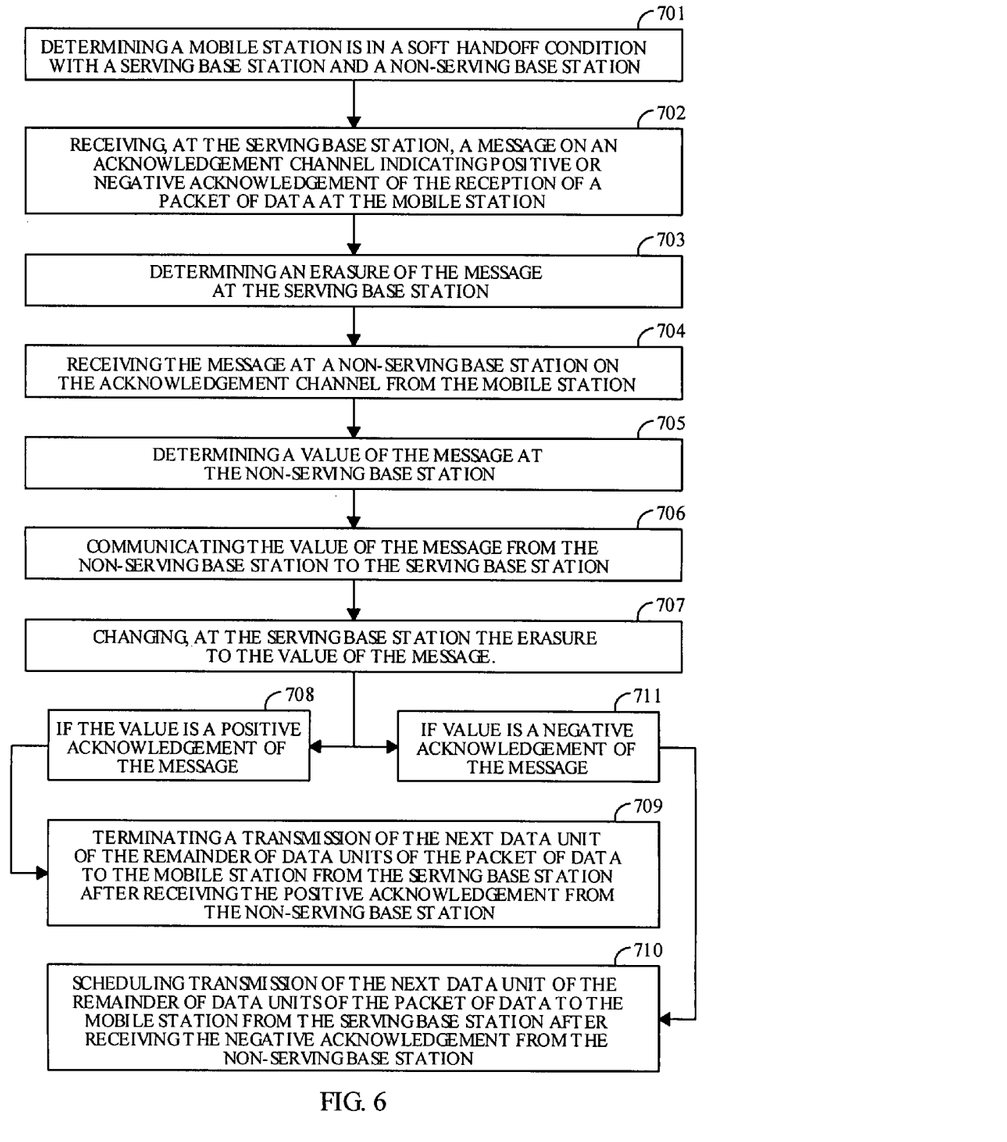
FIG. 6 illustrates a flow chart outlining an exemplary flow of steps for implementing various aspects of the invention.

Referring to FIG. 6, various aspects of the invention may be more apparent by referring to flow chart 700. At step 701, a control system, such as control system 410, determines that mobile station 102 is in a soft handoff condition with serving base station 101 and non-serving base station 160. At step 702, the serving base station 101 receives a message on an acknowledgement channel for indicating the reception of the data packet at the mobile station 102. Receiver 400 at the serving base station 101 determines an erasure of the message. At step 704, the non-serving base station 160 may also receives the message on the acknowledgement channel from the mobile station 102. The non-serving base station 160 determines a value of the message. At step 706, the value of the message is communicated from the non-serving base station 160 to the serving base station. At step 707, the serving base station 101 may change the erasure to the value of the message. At steps 708 and 709, if the value of the message is determined to be a positive acknowledgment message, the serving base station 102 may terminate a transmission of the remainder of data units to the mobile station 102 from the serving base station 101 after receiving the positive acknowledgment from the non-serving base station 160. At steps 710 and 711, if the value is a negative acknowledgment message, the serving base station 101 may schedule transmission of the next data unit in the packet of data to the mobile station 102 from the serving base station 101 after receiving the negative acknowledgement from the non-serving base station 160. In accordance with an embodiment, the serving and non-serving base stations may be included in the active set of base stations in the mobile station.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for acknowledging reception of a packet of data, comprising:
    receiving, at a serving base station, a message on an acknowledgement channel determined as one of a positive or negative acknowledgement for indicating said reception at a mobile station of said packet of data transmitted by said serving base station;
    determining an erasure of said message at said serving base station;
    receiving a value of said message from a non-serving base station at the serving base station; and
    changing, at said serving base station, said erasure based on said value of said message received from the non-serving base station wherein said value of said message from non-serving base station indicating positive or negative acknowledgment.

2. The method as recited in claim 1 wherein said value is a positive acknowledgment for said packet of data.

3. The method as recited in claim 2 further comprising:
    terminating a transmission of a remainder of data units of said packet of data to said mobile station from said serving base station after receiving said positive acknowledgment from said non-serving base station.

4. The method as recited in claim 1 wherein said value is a negative acknowledgment for said packet of data.

5. The method as recited in claim 4 further comprising:
    scheduling transmission of a next data unit in a remainder of data units of said packet of data to said mobile station from said serving base station after receiving said negative acknowledgement from said non-serving base station.

6. The method as recited in claim 1 wherein said mobile station is in a soft handoff condition with said serving and non-serving base stations.

7. The method as recited in claim 1 further comprising:
    determining a signal level of said message on said acknowledgment channel at said serving base station;
    comparing said determined signal level to a positive threshold and a negative threshold; and
    wherein said determining said erasure is due to having said determined signal level between said positive and negative thresholds.

8. The method as recited in claim 1 further comprising:
    determining a signal level of said message on said acknowledgment channel at said non-serving base station;
    comparing said determined signal level to a positive threshold and a negative threshold; and
    determining said value of said message based on said comparing.

9. The method as recited in claim 1 wherein said serving and non-serving base stations are in an active set of base stations in said mobile station.

10. The method as recited in claim 1 further comprising:
    obtaining a reverse link quality of said mobile station at said non-serving base station;
    determining a reverse link quality of said mobile station at said serving base station;
    comparing said reverse link quality at said non-serving base station to said reverse link quality at said serving base station; and
    wherein said changing said erasure at said serving base station is based on whether said reverse link quality at said non-serving base station is better than said reverse link quality at said serving base station.

11. The method of claim 1 further comprising:
    determining a signal level of said message on said acknowledgment channel;
    comparing said determined signal level to a plurality of thresholds; and
    determining said value of said message based on said comparing.

12. An apparatus for acknowledging reception of a packet of data for a communication system, comprising:
    a serving base station receiver, in a serving base station, for:
    receiving a message on an acknowledgement channel determined as one of a positive or negative acknowledgement for indicating said reception at a mobile station of said packet of data transmitted by said serving base station;
    determining an erasure of said message at said serving base station; and
    receiving a value of said message from a non-serving base station at the serving base station; and
    a serving base station controller, in said serving base station, for changing said erasure based on said value of said message received from the non-serving base station wherein said value of said message from non-serving base station indicating positive or negative acknowledgment.

13. The apparatus as recited in claim 12, wherein said value is a positive acknowledgment for said packet of data, and wherein said serving base station controller is configured for terminating a transmission of a remainder of data units of said packet of data to said mobile station from said serving base station after receiving said positive acknowledgment from said non-serving base station.

14. The apparatus as recited in claim 12, wherein said value is a negative acknowledgment for said packet of data, and wherein said serving base station controller is configured for scheduling transmission of a next data unit in a remainder of data units of said packet of data to said mobile station from said serving base station after receiving said negative acknowledgement from said non-serving base station.

15. The apparatus as recited in claim 12 wherein said mobile station is in a soft handoff condition with said serving and non-serving base stations.

16. The apparatus as recited in claim 12 wherein said serving base station receiver is configured for determining a signal level of said message on said acknowledgment channel at said serving base station, and comparing said determined signal level to a positive threshold and a negative threshold, wherein said determining said erasure is due to having said determined signal level between said positive and negative thresholds.

17. The apparatus as recited in claim 12 wherein said serving and non-serving base stations are in an active set of base stations in said mobile station.

18. An apparatus for wireless communication, comprising:
    means for receiving, at a serving base station, a message on an acknowledgement channel determined as one of a positive or negative acknowledgement for indicating reception at a mobile station of a packet of data transmitted by said serving base station;
    means for determining an erasure of said message at said serving base station;
    means for receiving a value of said message from a non-serving base station at the serving base station; and means for changing, at said serving base station, said erasure based on said value of said message received from the non-serving base station wherein said value of said message from non-serving base station indicating positive or negative acknowledgment.

19. The apparatus as recited in claim 18, further comprising:
   means for terminating transmission of a remainder of data units of said packet of data to said mobile station from said serving base station after receiving said value as a positive acknowledgment from said non-serving base station.

20. The apparatus as recited in claim 18, further comprising:
   means for scheduling transmission of a next data unit in a remainder of data units of said packet of data to said mobile station from said serving base station after receiving said value as a negative acknowledgement from said non-serving base station.

21. The apparatus as recited in claim 18, further comprising:
   means for obtaining a reverse link quality of said mobile station at said non-serving base station;
   means for determining a reverse link quality of said mobile station at said serving base station;
   means for comparing said reverse link quality at said non-serving base station to said reverse link quality at said serving base station; and
   wherein said means for changing said erasure at said serving base station comprises means for changing said erasure based on whether said reverse link quality at said non-serving base station is better than said reverse link quality at said serving base station.

22. A non-transitory processor-readable medium including processor-executable instructions for performing a method for acknowledging reception of a packet of data, the method comprising the steps of:
   receiving, at a serving base station, a message on an acknowledgement channel determined as one of a positive or negative acknowledgement for indicating said reception at a mobile station of said packet of data transmitted by said serving base station;
   determining an erasure of said message at said serving base station;
   receiving a value of said message from a non-serving base station at the serving base station; and
   changing, at said serving base station, said erasure based on said value of said message received from the non-serving base station wherein said value of said message from non-serving base station indicating positive or negative acknowledgment.

* * * * *